United States Patent [19]
Kedem et al.

[11] Patent Number: 5,288,385
[45] Date of Patent: Feb. 22, 1994

[54] SUPPORTED, MECHANICALLY STABLE BIPOLAR MEMBRANE FOR ELECTRODIALYSIS

[75] Inventors: Ora Kedem; Abraham Warshawsky, both of Rehovot, Israel

[73] Assignee: Yeda Research and Development Co., Ltd., Rehovot, Israel

[21] Appl. No.: 852,817

[22] Filed: Mar. 17, 1992

[30] Foreign Application Priority Data

Mar. 20, 1991 [IL] Israel ......................................... 97605

[51] Int. Cl.⁵ ............................................. B01D 61/42
[52] U.S. Cl. ..................................... 204/263; 204/296; 204/301; 521/27; 521/30; 156/308.4
[58] Field of Search .......................... 204/296, 263, 301; 521/27, 30; 156/60, 308.4

[56] References Cited

U.S. PATENT DOCUMENTS 4,116,889  9/1978  Chlanda et al. ................... 204/182.4

*Primary Examiner*—Kathryn Gorgos
*Attorney, Agent, or Firm*—Helfgott & Karas

[57] ABSTRACT

A supported, mechanically stable bipolar membrane for electrodialysis having a cation-exchange layer on one side and an anion-exchange layer on the other side of a single sheet of woven fabric. The cation exchange layer is heterogeneous, the anion exchange layer is homogeneous and the two are interlocked. A process of making such bipolar membranes is described. The bipolar membrane may be fabricated into electrodialysis cells in which two membranes are joined along their edges.

5 Claims, 2 Drawing Sheets

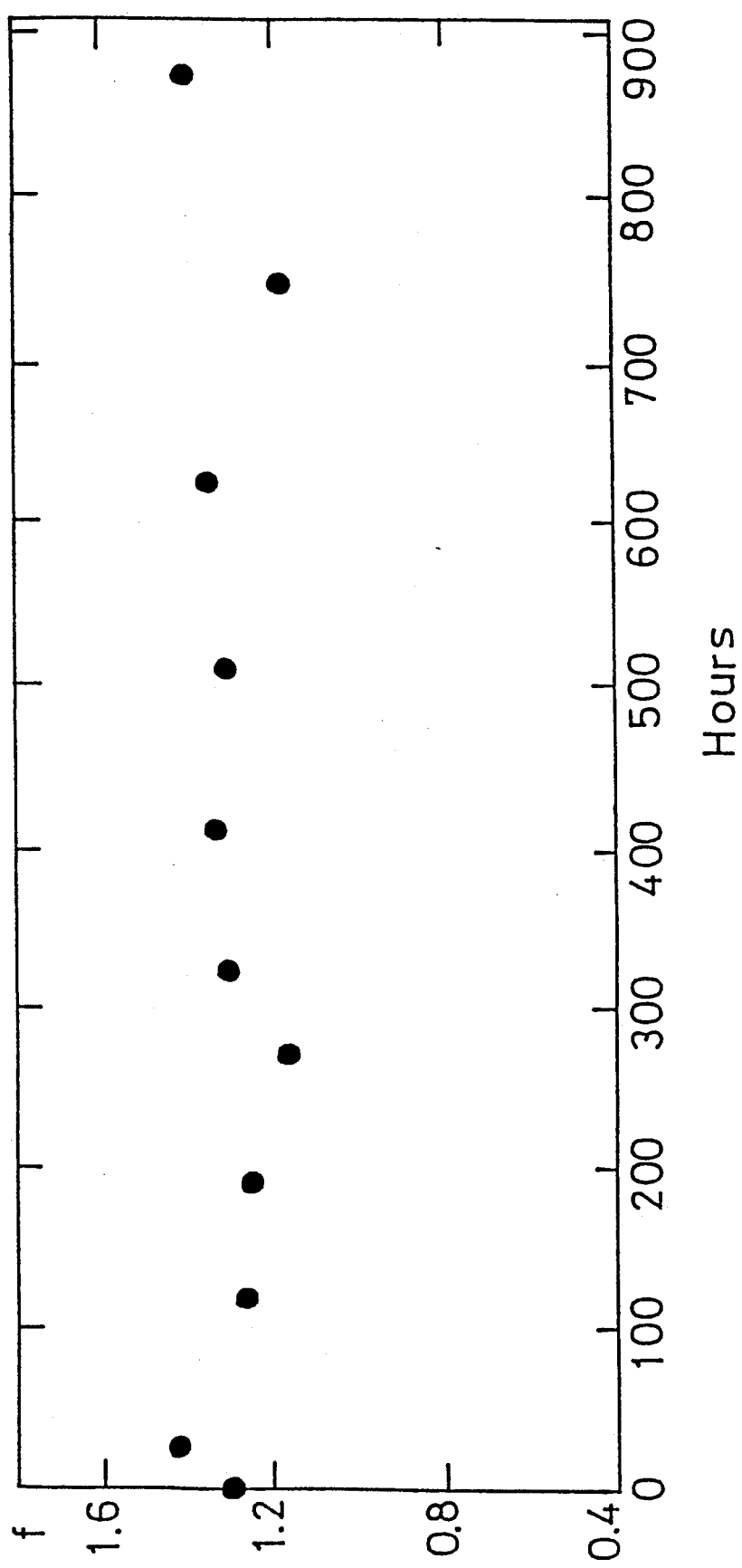

SUPPORTED, MECHANICALLY STABLE BIPOLAR MEMBRANE FOR ELECTRODIALYSIS

FIELD OF THE INVENTION

The present invention is in the field of ion-exchange membranes and concerns novel bipolar (BP) ion-exchange membranes of high mechanical stability suitable for use in electrodialysis processes of the kind in which electric current is periodically reversed, also known as electrodialysis reversal (EDR) processes.

BACKGROUND OF THE INVENTION AND PRIOR ART

Electrodialysis is based on the phenomenon that in aqueous electrolyte solution conventional ion-exchange membranes are permselective in that they are capable of selectively transporting charged species across their boundaries under the influence of an electric field. Cation-exchange membranes carry fixed negatively charged groups and, therefore, pass preferentially positively charged ions, and anion-exchange membranes carry fixed positively charged groups and pass preferentially negatively charged ions. Ideally, permselective ion-exchange membranes allow the passage of ions of one sign and completely prevent the passage of the ions of the opposite sign. In practice, however, permselectivity is as a rule not ideal. For a given membrane, it is highest in dilute solutions and decreases with increasing salt concentration.

Bipolar (BP) membranes comprise a cation-exchange (C) and anion-exchange (A) layer. The BP membranes of different compositions and their applications are described in several articles and patents. For example, U.S. Pat. No. 3,372,101 (Kollsman) describes the preparation of such membranes by bonding together separately prepared anion- and cation-exchange films or membranes, using a hydraulic press.

U.S. Pat. Nos. 4,024,043 and 4,057,481 (both to Dege et al.) describe single-film bipolar membranes. The film contains a high amount of an insoluble cross-linked aromatic polymer, to which, in a first step, highly dissociable cationic exchange groups are chemically bonded at one side and highly dissociable anionic exchange groups are then chemically bonded to the other side. U.S. Pat. No. 3,562,139 (Leitz) describes asymmetrical BP membranes prepared in a similar way. In these asymmetrical membranes, the two layers of opposite polarity have different charge densities which lead to different permselectivities and to different concentration dependencies of the latter. In such BP membranes, the thickness of the A- and C-layers may be different. Japanese Patent Publications Nos. 78-158638 and 79-7196, (both of Tokuyama Soda Co. Ltd.) disclose a similar method with the added feature of masking one side of the film while reacting the other. In a recent patent publication, the successful joining of separately prepared A-and C-membranes was reported (PCT/AU88/00279). Another approach to the preparation of BP membranes involve casting two layers one on top of the other. Such an approach was reported by Bauer et al. in Desalination 68,279 (1988). In this example, Bauer et al. cast an A-layer made of chloromethylated polystyrene, mixed with other polymers which were then aminated, followed by casting the C-layer on top of the A-layer.

In the following, an electrodialysis set-up in which the A-layer of a BP membrane faces the anode will be referred to as the bipolar direction while a set-up in which the C-layer faces the anode will be referred to as the reverse direction.

In the performance of electrodialysis with a BP membrane in the bipolar direction, ions are drawn out from the interface between the membranes of opposite polarity-anions through the A-layer and cations through the C-layer. This effectively exhausts the salt ions from the interface, and in consequence of the processes that occur at the interface between the A- and C-layers, the overall result is a continuous dissociation of water into $H^+$ and $OH^-$ ions with the generation of equivalent amounts of acid and base. Such a process is often referred to in the literature as "water splitting". However, to avoid confusion with the process of water decomposition into hydrogen and oxygen gases, the process will be referred to herein as "acid-base generation".

When a BP membrane operates in the reverse direction, salt is pushed into the membrane interface from both surfaces. This salt flow causes water flow into the membrane both by osmosis and by electro-osmosis, which tends to destroy the BP membrane by blister formation or separation of the two layers. In consequence, all known BP membranes are sensitive to current reversal and have a short operational life under these conditions which is a major shortcoming of EDR processes in which the current is reversed periodically, say every 15 to 20 minutes, to avoid membrane fouling. There has, thus, been a need in the art of EDR processes for BP membranes which are not sensitive to current reversal.

It is, thus, the object of the present invention to fulfil this long-felt need and provide improved BP membranes of high mechanical stability suitable for use in EDR processes, which are not prone to blister formation and are capable of withstanding the strains of periodic current reversal during long periods of time.

SUMMARY OF THE INVENTION

In the present description, the term "heterogeneous" when used in relation to a C-layer means that the C-layer comprises a polymer matrix holding a plurality of cation-exchange particles. The term "homogeneous" when used in relation to an A-layer means that the A-layer contains a polymer which itself carries the anion-exchange groups.

In accordance with the present invention, there is provided a supported, mechanically stable bipolar membrane for electrodialysis having a cation-exchange layer on one side and an anion-exchange layer on the other side, characterized in that:
i) the cation-exchange and anion-exchange layers are supported by a single sheet of woven fabric;
ii) the cation-exchange layer is heterogeneous;
iii) the anion-exchange layer is homogeneous; and
iv) the anion-exchange layer is anchored in the cation-exchange layer whereby the anion- and cation-exchange layers are interlocked.

For certain applications, it may be desirable to combine two BP membranes according to the invention into a sealed electrodialysis cell having a similar structure as that described by Kedem et al. in U.S. Pat. No. 4,217,200 and U.S. Pat. No. 4,569,747. Such cells are made by sealing together along the edges two membranes according to the invention, e.g. by heat sealing. Accordingly, the invention also provides electrodialysis cells consisting of two BP membranes of the kind specified, fitted with means for ingress and egress of liquid. To facilitate the sealing together of two BP membranes according to the invention as specified, it is preferred that at least one of the A- and C-layers contain an amount of a thermoplastic polymer such as a polysulfone, whereby the membranes are amenable to being joined by heat sealing.

The invention further provides a process for the preparation of a supported, mechanically stable bipolar membrane of the kind specified, which process comprises:

i) casting on a supporting fabric sheet from a first casting solution a heterogeneous cation-exchange layer to produce a supported, non-porous cation-exchange membrane;

ii) soaking said supported cation-exchange membrane with water and then drying it;

iii) casting on one side of the said supported cation-exchange membrane from a second casting solution a homogeneous haloalkylated aromatic polymer layer as anion-exchange precursor; and iv) aminating the haloalkyl groups of said anion-exchange layer precursor layer with a tertiary amine whereby the said homogeneous anion-exchange layer is formed.

The term "aromatic polymer" as used herein signifies a homo- or co-polymer with recurring aromatic units. Typical examples of haloalkylated aromatic polymers suitable for the purposes of the present invention are bromomethylated aromatic polysulfones.

When the C-layer membrane resulting from step (i) is soaked with water, the cation particles swell and push away the polymer matrix. Upon redrying the water-soaked membrane, narrow empty spaces are formed around the ion-exchange particles of the C-layer to which the cast haloalkylated aromatic polymer can penetrate whereby the resulting A-layer precursor is anchored in the C-layer, and the two layers are interlocked. This interlock remains intact upon amination of the haloalkyl groups of the precursor to yield the final, homogeneous A-layer.

In consequence of the interlock between the C- and A-layer, the BP membranes according to the invention have a dramatically improved tolerance toward current reversal in electrodialysis.

If desired, the second casting solution used in step iii) above may contain an amount of a thermoplastic polymer such as a polysulfone, compatible with said haloalkylated polymer. Also, if desired, the second casting solution may contain an amount of a secondary amine for reaction with part of the haloalkyl groups of the said haloalkylated polymer.

In accordance with the present invention, the heterogeneous C-layer may contain any strong acid cation-exchanger. Preferably, the cation-exchanger particles are made of sulfonated polystyrenes cross-linked with a varying percentage of divinyl benzene. Typically, the polymer matrix of the heterogeneous C-layer in a BP membrane according to the invention is an aromatic polymer.

Where a thermoplastic polymer is incorporated in the second casting solution, it is preferred to use as matrix for the heterogeneous C-layer the same thermoplastic polymer that is incorporated in the said second casting solution.

Typical examples of haloalkylated aromatic polymer which can be used for casting the homogeneous A-layer precursor are chloromethylated polystyrene and halomethylated aromatic polysulfones of which bromomethylated aromatic polysulfones are particularly preferred.

Halomethylated aromatic polysulfones are prepared by halomethylation of polysulfones, e.g. in accordance with the teachings of Warshawsky et al. in U.S. Pat. No. 4,568,700.

Due to the fact that electric charging of the A-layer, by amination is effected only after casting when the precursor layer is already firmly attached to the cross-linked C-layer, charge cancellation between the two layers is minimized.

Mutual charge cancellation may be further reduced by adding a cross-linking agent, e.g. an amine such as diethylamine to the haloalkyl polysulfone casting solution. Each molecule of such a cross-linking amine forms a tertiary amine with one haloalkyl group of the haloalkylated polysulfone and is subsequently quaternized with a further haloalkyl group whereby, upon drying, two polymer chains are linked. This is then followed by amination with a tertiary amine such as trimethylamine.

The advantages of the BP membranes according to the invention may be summed up briefly as follows:

i) the interlocking between the C- and A-layers results in a higher tolerance towards current reversal which makes them suitable for electrodialysis with periodic current reversal;

ii) the interface is first formed between a firmly cross-linked heterogeneous C-layer and an A-layer precursor. Consequently, both layers are immobilized so that upon electric charging of the A-layer precursor by amination with a tertiary amine to yield the final A-layer, the mutual neutralization of electric charges is minimized;

DESCRIPTION OF THE DRAWINGS

In the following, the performance of BP membranes according to the invention will be described, by way of example only, with reference to the annexed drawings in which:

FIG. 2 is a graphic representation showing the number of equivalents of Ca removed as a $CaCO_3$ precipitation per faraday passed for each precipitation experiment during a prolonged operation with periodic current reversal.

SPECIFIC DESCRIPTION OF THE INVENTION

Figure 1:
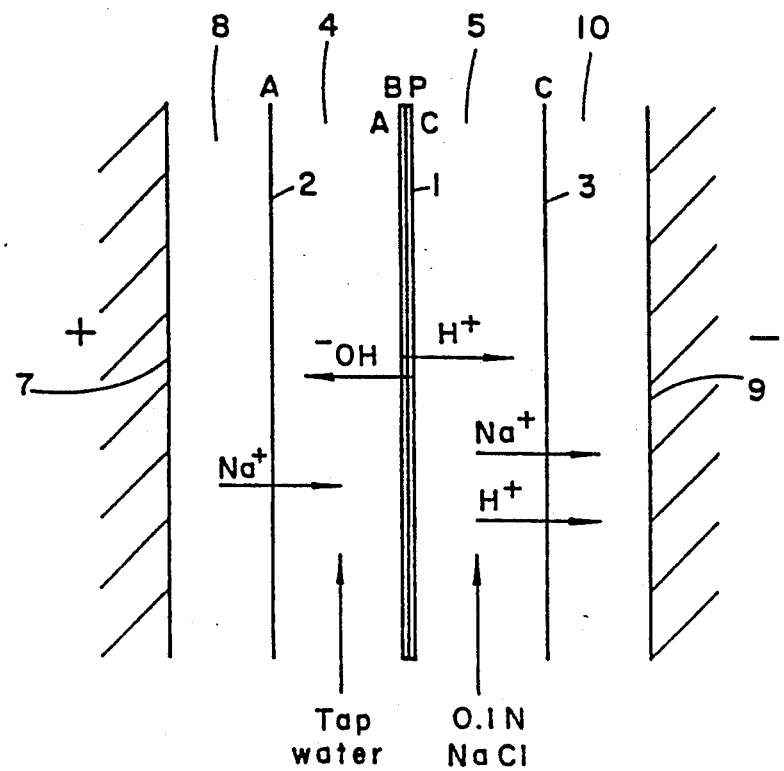
FIG. 1 is a diagrammatic representation of an experimental cell for testing the performance of BP membranes according to the invention prepared in accordance with Examples 1, 2 and 3 herein.
Figure 3:
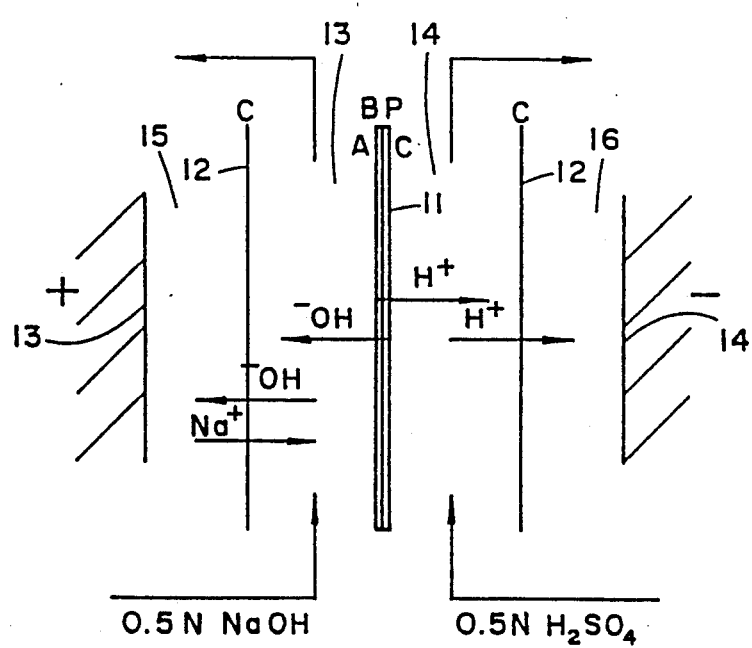
FIG. 3 is a diagrammatic representation of an experimental cell for a performance experiment in accordance with Example 4 herein.

The preparation and performance of BP membranes according to the invention is illustrated in the following Examples to which the invention is not limited.

Example 1

A polyester fabric (ESTAL 6 of Swiss Silk Bolting Cloth Co.) was coated with a heterogeneous C-layer from a casting solution containing 13.5 gr of dissolved polysulfone (Udel P 3500 by Union Carbide) and 20 gr suspended ground cation exchanger (Purolite Na-polystyrene sulfonate) in 100 ml of N-methylpyrrolidone (NMP)/butanol, 9:1 (by volume). The exchange capacity of the Purolite Na-polystyrene sulfonate was 2.8–3.4 meq/gr of dry polymer. The resulting C-layer membrane was oven dried, then soaked in water and redried.

An A-layer precursor casting solution was prepared by dissolving a mixture of bromomethylated polysulfone, carrying 1.6 milliequivalent of $CH_2$ groups per gram of polymer, as determined by nuclear magnetic resonance (NMR), and polysulfone in NMP/ethanol, volume ratio 9:1. The A-layer precursor was cast on the supported C-membrane. The composite membrane was then immersed in a 10% solution of trimethylamine overnight, whereby the A-layer precursor was aminated to yield quaternary ammonium groups to yield the final, homogeneous A-layer.

The performance of the resulting BP membrane in electrodialytic acid-based generation was tested in an experimental flow-through cell in which hard tap water was electrodialyzed against an aqueous 0.1 NaCl solution. The experimental cell is diagrammatically illustrated in FIG. 1. It comprised a BP membrane 1 flanked by monopolar C-membranes 2 and 3 forming a base compartment 4 and an acid compartment 5 to the left and right of membrane 1. The C-membrane 2 formed with an anode 7 and anode compartment 8 and likewise the C-membrane 3 formed with a cathode 9 a cathode compartment 10. The exposed membrane areas were 15 $cm^2$.

The frames holding the various components of the cell carried several inlet and outlet tubules in the bottom and top edges. All this is known per se and is not shown for the sake of simplicity of illustration.

One liter of hard tap water was circulated through the base compartment 4 for 23 minutes, and during the same period, one liter of an aqueous 0.1N NaCl solution was circulated through the acid compartment 5. Electric current of 15 $mA/cm^2$ was passed through the membranes. After 18 minutes, precipitate of $CaCO_3$ appeared in the tap water circulating through the base compartment 4. After an additional 5 minutes, the current and water flow were interrupted and the tap water was filtered and analyzed.

The original tap water contained 7.8 meq/lit of total hardness (Ca+Mg). The filtrate obtained after the softening treatment contained 3.25 meq/lit of Ca+Mg, and accordingly, the efficiency of Ca+Mg removal was 1.41 equivalent/faraday.

Example 2

A support made of polypropylene fabric was coated by a casting solution containing 13.5% of polysulfone (Udel P 3500 by Union Carbide) dissolved in NMP/butanol, 9:1 (by volume), and 27 gr of ground cation exchange resin (Purolite Na-polystyrene sulfonate). After drying at 100° C., the C-layer membrane was soaked in water and redried. On this C-membrane, an A-layer was cast from the following two casting solutions:

Solution 1—4.5 gr of bromomethylated polysulfone carrying 2.0 of —$CH_2Br$ groups per gram of polymer and 0.5 gr of polysulfone in 50 ml of methylene chloride/NMP, 4:1 by volume. Before casting, 0.5 ml of diethylamine was added to the mixture, and the mixture was stirred for 15 minutes.

Solution 2—Same polymer mixture dissolved in NMP/ethanol, 9:1 by volume.

Solution 1 was cast with a doctor knife on the C-sheet, dried in a stream of air and then in an oven at 90°–100° C. Solution 2 was casted on this layer and dried in an oven at 90°–100° C. for 30 minutes.

The membrane was tested in a flow-through cell of the kind shown in FIG. 1 and in the same manner described in Example 1, with the following results:

| | |
|---|---|
| (Ca + Mg) in original tap water | 7.45 meq/lit; |
| (Ca + Mg) after precipitation and filtration | 2.20 meq/lit; |
| (Ca + Mg) removal efficiency | 1.39 eq/faraday |

Example 3

A BP membrane according to the invention was tested for stability towards current reversal in a cell similar to that shown in FIG. 1. An 0.1 solution of NaCl in tap water was prepared and the same solution was circulated at equal rate through both compartments 4 and 5 so that the pH changes caused on both sides of the membrane were mutually neutralized at each cycle. Current of 15 $mA/cm^2$ was passed through the cell with automatic current reversal every 15 minutes. The experiment was run continuously for 36 days except for interruptions for testing. The membrane was found to have remained intact over the entire period and no blister formation could be detected.

The performance of this experiment is shown in FIG. 2.

At the times indicated in FIG. 2, the NaCl solution streams were disconnected and the cell was thoroughly rinsed. One liter of an 0.1N NaCl solution was circulated through compartment 5 and 1 liter of hard tap water through compartment 4. A current of 15 $mA/cm^2$ was passed through the cell as above. After precipitation of $CaCO_3$, the tap water was filtered, and residual Ca+Mg concentration determined. The amount of Ca+Mg precipitated per faraday passed, f, is given in FIG. 2.

Example 4

A BP membrane was prepared as in Example 1 and was tested for acid-base generation in a test cell illustrated diagrammatically in FIG. 4. As shown, a BP membrane 11 according to the invention was flanked by two identical monopolar C-membranes 12 with the formation of a base compartment 13 and an acid compartment 14. The cell further comprised anode 13 and cathode 14 forming with the two C-membranes 12 an anode compartment 15 and a cathode compartment 16. The exposed membrane area was 15 $cm^2$.

An amount of 247 ml of an approximately 0.5N aqueous $H_2SO_4$ solution was flowed through compartment 14 at a rate of 14 cm/sec, and an aqueous 0.5N NaOH solution was flowed at the same rate through the base compartment 13. After 75 minutes, the $H^+$ concentration was determined in the solution withdrawn from compartment 14. Since the C-membranes 12 were nearly ideally permselective in acid solution, unchanged concentration of acid would mean 100% efficiency of acid production by the BP membrane. In the basic solution, the C-membrane is not ideally permselective and a smaller increase of base concentration than would be equivalent to the acid production was to be expected.

The results obtained were as follows:
Concentration of $H_2SO_4$ before electrodialysis—0.507N
Concentration of $H_2SO_4$ after 75 min of a 50 $mA/cm^2$ current flow—0.48N
Efficiency—80%

We claim:

1. A supported, mechanically stable bipolar membrane for electrodialysis having two sides and having a cation-exchange layer on one side of said membrane and an anion-exchange layer on the other side of said membrane, wherein:
   i) the cation-exchange and anion-exchange layers are supported by a single sheet of woven fabric;
   ii) the cation-exchange layer is heterogeneous;
   iii) the anion-exchange layer is homogeneous; and
   iv) the anion-exchange layer is anchored in the cation-exchange layer whereby the anion- and cation-exchange layers are interlocked.

2. A bipolar membrane according to claim 1, characterized in that at least one of the cation-exchange and anion-exchange layers contains a thermoplastic polymer.

3. A bipolar membrane according to claim 2, wherein said thermoplastic polymer is a polysulfone.

4. An electrodialysis cell according to claim 1 having means for ingress and egress of liquid comprising two bipolar membranes joined along their edges.

5. A method of making the electrodialysis cell of claim 4 comprising joining two bipolar membranes together along their edges.

* * * * *